2844

F. Nishwitz.

Mower.

No 3371 Reissued Apr. 13, 1869.

WITNESSES:

J. Snowden Bell
Jos. S. Peyton

INVENTOR.

F. Nishwitz

UNITED STATES PATENT OFFICE.

FREDERICK NISHWITZ, OF BROOKLYN, NEW YORK.

IMPROVEMENT IN HARVESTERS.

Specification forming part of Letters Patent No. 19,377, dated February 16, 1858; Reissue No. 44, dated March 5, 1861; Reissue No. 3,371, dated April 13, 1869.

*To all whom it may concern:*

Be it known that I, FREDERICK NISHWITZ, of Brooklyn, in the county of Kings and State of New York, have invented certain new and useful Improvements in Harvesters, of which the following is a full, clear, and exact description.

The improvement herein claimed relates to that class of two-wheeled harvesters having a laterally-projecting cutting apparatus known as "front-cut" machines. Its objects are to allow the finger-beam to rise or fall to conform to inequalities of the surface over which it glides, to enable the driver to raise the cutting apparatus to pass obstructions, and to hold the cutter at any desired elevation from the ground; and the invention herein claimed consists, first, in a novel method of combining a vibrating tongue or draft-frame with a cutting apparatus projecting laterally beyond the supporting-wheels and connected by one end only with a frame vibrating about a gear-center; second, in a novel method of combining a vibrating tongue or draft-frame with a frame carrying a counter-shaft and a crank-shaft, and vibrating about a gear-center; third, in a novel method of combining two wheels, a main frame arranged between the wheels, a laterally-projecting cutting apparatus secured to the main frame by one end only, a vibrating tongue or draft-frame, and a lifting hand-lever and cord or chain operated by the driver; fourth, in a novel method of combining a vibrating tongue, a vibrating gear-frame, and a lifting-lever, a cord or chain, and a detent with a tripping device for releasing the lever and allowing the cutting apparatus to drop quickly; fifth, in a novel method of combining in a harvester two wheels, a tongue secured directly to the axle of said wheels, a main frame arranged between the wheels projecting beyond their peripheries at either end and vibrating on the main axle, a laterally-projecting cutting apparatus connected with the gearing-frame at one end only, and a lifting-lever and cord or chain.

Figure 1:
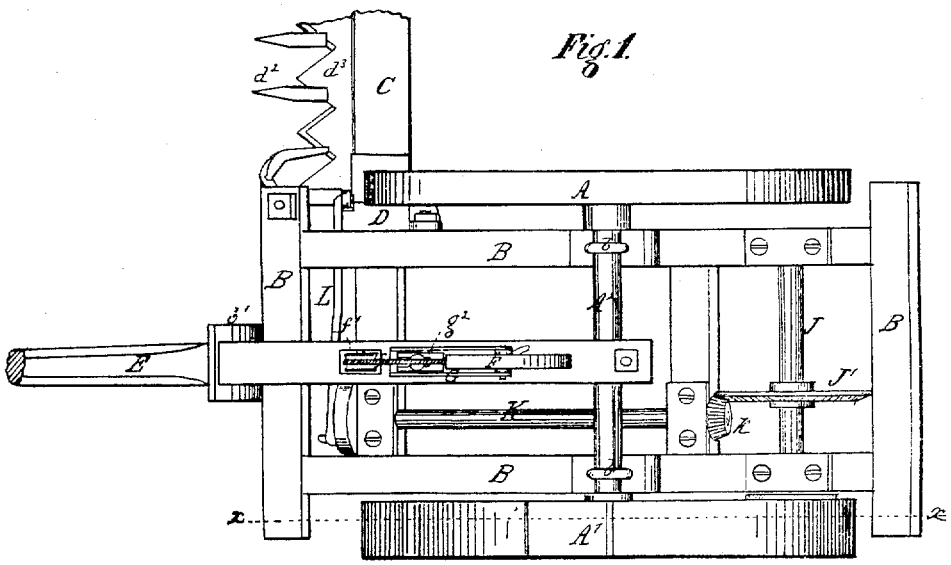
Figure 2:
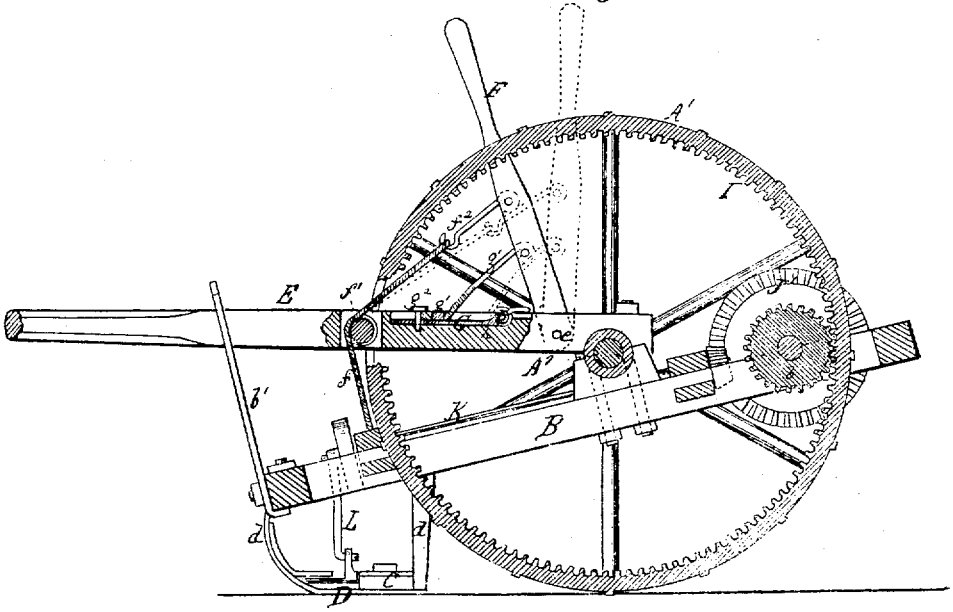

In the accompanying drawings, which show all my improvements embodied in one machine, Figure 1 represents a plan or top view of my improved harvester; and Fig. 2, a side view of the same, partly in elevation and partly in section, at the line *x x* of Fig. 1.

In this instance two wheels, A A′, are shown as turning loosely on a fixed axle, $A^2$, from which a stout rectangular main or gearing frame, B, is suspended by loops *b*, by which means this frame is free to rock or vibrate with the axle. A finger-beam, C, projects laterally from the inner front corner of the frame B, to which its heel end is secured by means of a strong metallic shoe, D. Branches *d d′* connect the shoe with the frame, thus permitting the finger-beam to run close to the ground while the frame is carried at a height sufficient to pass over the mown grass. By this mode of construction both the frame B and finger-beam vibrate together with the axle $A^2$, and the finger-beam is free to rise and fall to conform to inequalities of the ground over which it passes. Open slotted guards $d^2$ and reciprocating scalloped cutters $d^3$ are secured upon the finger-beam in the usual well-known way. The grain end of the finger-beam is provided with a divider and shoe of well-known form, but has no connection with the main frame save through the heel end of the finger-beam, as above described.

A tongue or draft-frame, E, is fastened to and vibrates on the main axle, projecting centrally beyond the front of the main frame. A loop, *b′*, attached to the front of the gearing-frame B passes over the tongue and acts as a stop to prevent the cutting apparatus from dropping into dead-furrows or other sudden depressions in its path, while leaving it free to rise over ridges.

In order to raise the cutting apparatus from the ground, a cord or chain, *f*, is attached to the frame B, passed over a pulley, *f′*, on the tongue, and attached to a hand-lever, F, pivoted on the tongue, so as to play freely vertically backward and forward on its fulcrum *e*. The hook $f^2$ on the lever enables the lifting-chain readily to be adjusted by taking up or letting out one or more links.

In order to carry the cutting apparatus at any desired elevation, I pivot one end of a swinging pawl, *g*, to the lifting-lever and let the other rest on a detent, *g′*, on the tongue, which detent limits the forward movement of the lever, and consequently the descent of the finger-beam.

In order to regulate the height at which the cutting apparatus is held, I mount the stop $g'$ on a plate, G, and set it backward or forward by a slot and set-screw, $g^2$. The stop $b'$ limits the descent of the cutters, while the detent $g'$ also limits them to a smaller range of movement. When the cutters are raised the pawl $g$ catches against the back end of the plate G, as shown in red in Fig. 2, and holds them up.

In order to drop the cutters quickly after passing an obstruction, instead of lowering them gradually by the hand-lever, a tripping-lever, $h$, is pivoted on the tongue to play vertically beneath the pawl and lift it from the plate G when required. This the driver does with his foot.

An internally-geared spur-wheel, I, on the wheel A′ drives a corresponding pinion, $i$, on a counter-shaft, J, turning in suitable bearings on the frame B in rear of the axle $A^2$ and parallel with it, and carrying a bevel-wheel, J′, which drives a corresponding pinion, $k$, on a crank-shaft, K, also having its bearings in the frame B, but crossing the axle. The cutters are driven by a crank and pitman, L, in the usual way.

What I claim herein is—

1. The combination, in a two-wheeled front-cut harvester, of a tongue or draft-frame vibrating about a gear-center, with a frame vibrating about a gear-center, and laterally projecting cutting apparatus secured by one end only to the inner front corner of the vibrating frame, the combination being and operating substantially as set forth.

2. The combination, in a two-wheeled front-cut harvester, of a tongue or draft-frame vibrating about a gear-center, a frame carrying a counter-shaft and a crank-shaft, and vibrating about a gear-center, and a laterally-projecting cutting apparatus connected with the gear-frame at one end only, substantially as set forth.

3. The combination, in a front-cut harvester, of two wheels, a main frame arranged between the wheels, a laterally-projecting cutting apparatus secured to the frame at one end only, a vibrating tongue or draft-frame, and a lifting hand-lever and cord or chain operated by the driver, substantially as set forth.

4. The combination of a vibrating tongue, a vibrating gear-frame, a lifting-lever, a cord or chain, and pawl with a tripping-lever operated by the driver's foot, substantially as set forth.

5. The combination, substantially as set forth, of two wheels, a tongue or draft-frame secured directly to the axle of said wheels, a main frame arranged between the wheels, projecting beyond their peripheries at either end, and vibrating about the main axle, a laterally-projecting cutting apparatus connected with the gearing-frame at one end only, and a lifting-lever and cord or chain.

F. NISHWITZ.

Witnesses:
JOE I. PEYTON,
BATTIS DE LONG.